United States Patent
Wang et al.

(10) Patent No.: US 9,198,217 B2
(45) Date of Patent: Nov. 24, 2015

(54) METHOD FOR MAINTAINING CONNECTION BETWEEN TERMINAL AND NETWORK SERVER, TERMINAL AND NETWORK SERVER

(75) Inventors: Hui Wang, Beijing (CN); Yongzhen Tian, Beijing (CN); Xiaoding Li, Beijing (CN); Yitang Zhuang, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 643 days.

(21) Appl. No.: 13/498,655

(22) PCT Filed: Sep. 21, 2010

(86) PCT No.: PCT/CN2010/077187
§ 371 (c)(1),
(2), (4) Date: Mar. 28, 2012

(87) PCT Pub. No.: WO2011/038653
PCT Pub. Date: Apr. 7, 2011

(65) Prior Publication Data
US 2012/0188928 A1      Jul. 26, 2012

(30) Foreign Application Priority Data
Sep. 29, 2009  (CN) .......................... 2009 1 0235573

(51) Int. Cl.
*G08C 17/00*     (2006.01)
*H04W 76/04*    (2009.01)
(Continued)

(52) U.S. Cl.
CPC ......... *H04W 76/045* (2013.01); *H04L 43/0811* (2013.01); *H04L 43/10* (2013.01); *H04L 67/145* (2013.01); *Y02B 60/50* (2013.01)

(58) Field of Classification Search
CPC .................................................. H04L 43/0811

USPC ........................................................ 370/311
See application file for complete search history.

(56) References Cited

U.S. PATENT DOCUMENTS 5,592,538 A * 1/1997 Kosowsky et al. ......... 379/93.08
8,150,976 B1 * 4/2012 Zhang et al. .................. 709/227
(Continued)

FOREIGN PATENT DOCUMENTS

CN            101234017           8/2008
CN            101364998           2/2009
(Continued)

OTHER PUBLICATIONS

PCT/CN2010/077187 International Search Report dated Dec. 1, 2010 (3 pages).
(Continued)

*Primary Examiner* — Dang Ton
*Assistant Examiner* — Nourali Mansoury
(74) *Attorney, Agent, or Firm* — Brinks Gilson & Lione; G. Peter Nichols

(57) ABSTRACT

A method for maintaining the connection between a terminal and a network server is described. The terminal has a first processing unit with a first state and a second state, wherein the power consumption of the second state is less than the power consumption of the first state. When the first processing unit is in the second state, the terminal or the network server sends heartbeat data packets periodically in order to maintain the connection between said terminal and said network server. During the period that the terminal or the network server sends a periodic heartbeat data packet, a main processor of the terminal will not be woken up Thus, the terminal in a sleep state can maintain connection with the network server, and not be woken up due to the heartbeat data packets sent by the network server, which reduces the power consumption of the terminal.

12 Claims, 4 Drawing Sheets

(51) Int. Cl.
*H04L 12/26* (2006.01)
*H04L 29/08* (2006.01)

(56) References Cited

U.S. PATENT DOCUMENTS

2006/0182025 A1* 8/2006 Kim et al. .................... 370/229
2009/0016251 A1 1/2009 Adams et al.
2011/0010446 A1* 1/2011 Chen et al. .................... 709/224

FOREIGN PATENT DOCUMENTS

CN 101471992 7/2009
WO WO 2009/011734 1/2009

OTHER PUBLICATIONS

International Preliminary Report on Patentability for PCT Patent Application Serial No. PCT/CN2010/077187, dated Apr. 3, 2012, 7 pages.

* cited by examiner

| VERSION NUMBER (4 BITS) | IP HEADER LENGTH (4 BITS) | SERVICE TYPE (TOS) (8 BITS) | TOTAL LENGTH (16 BITS) | | |
|---|---|---|---|---|---|
| IDENTIFIER (16 BITS) | | | MARK (3 BITS) | SEGMENT OFFSET (13 BITS) | IP BASIC HEADER (20 BYTES) |
| LIFETIME (TTL) (8 BITS) | | PROTOCOL TYPE (8 BITS) | HEADER CHECK-SUM (16 BITS) | | |
| SOURCE IP ADDRESS (32 BITS) | | | | | |
| DESTINATION IP ADDRESS (32 BITS) | | | | | |
| SOURCE PORT NUMBER (16 BITS) | | | DESTINATION PORT NUMBER (16 BITS) | | TCP BASIC HEADER (20 BYTES) |
| SEQUENCE NUMBER (32 BITS) | | | | | |
| ACKNOWLEDGE NUMBER (ACK) (32 BITS) | | | | | |
| TCP HEADER LENGTH (4 BITS) | RESERVE (6 BITS) | TCP MARK BIT (6 BITS) | WINDOW SIZE (16 BITS) | | |
| TCP CHECK-SUM (16 BITS) | | | EMERGENCY POINTER (16 BITS) | | |

FIG. 3

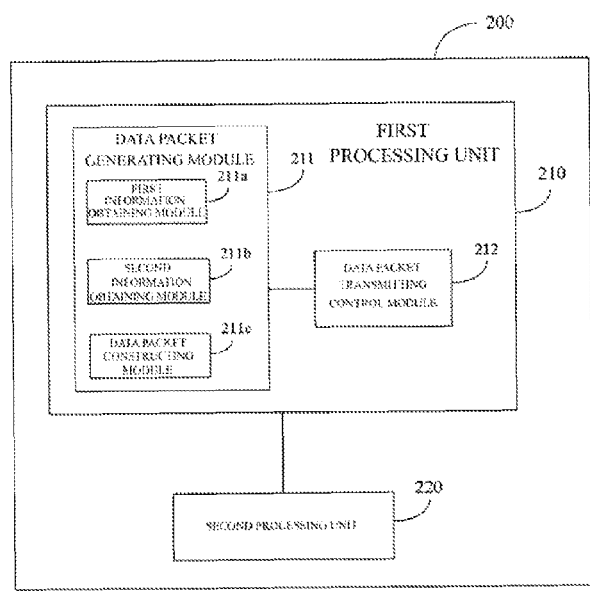

FIG. 4

METHOD FOR MAINTAINING CONNECTION BETWEEN TERMINAL AND NETWORK SERVER, TERMINAL AND NETWORK SERVER

BACKGROUND

The invention relates to communication and network technology field, and in particular, to a method, a terminal and a network server for maintaining a connection between a terminal and a network server.

Portable devices (i.e., terminals such as cell phones, portable computers) access to the Internet through a wireless network (such as 3G). Because the number the addresses is not enough, in order to save public IP addresses, the IP address used by a portable device is usually a private address. Therefore, it is necessary to perform Network Address Transform (NAT) through a network agent means or gateway and then connect the portable device to the Internet. This may cause a host or a server on the Internet to be unable to actively initiate a connection to the handheld device.

In order to obtain some application data from a server (for example, the server push some real-time information that user cares about), one of the solutions provided in the prior art is that a portable device actively initiates a TCP or UDP connection to the server, so as to establish a connection channel between the server and the portable device, so that the server can use this TCP or UDP channel to perform data transmission. However, if there is no data transmission on the TCP or UDP connection within a period of time T, then a network agent means or a gateway corresponding to the portable device will clean up the connection state, which causes the connection to be broken. At this point, the server or the portable device cannot keep on using the connection channel continuously. The data transmission intermittent period T varies depending on different used networks. For example, in tests, a data transmission intermittent period T of some 3G networks is about 11 minutes, while a data transmission intermittent period T of some GSM networks is about 18 minutes, and so on.

In order to maintain the connection between the server and the portable device, the current solution is that the portable device transmits "heartbeat" data to the server within a period less than T (or the server transmits the "heartbeat" data to the portable device), so that the corresponding TCP or UDP channel maintains "active" state, thereby the intermediate NAT gateway will not clean up the channel. Since the data transmission intermittent periods T for different networks are different, it is difficult to determine a reasonable period for transmitting the connection-maintaining data when designing; if the period is set to be too short, it will frequently wake the CPU and the whole operating system of the portable device, which causes the portable device to consume a lot of power. Even if the "heartbeat" data is transmitted from the server to the portable device, the main CPU and the whole operating system of the portable device will be wakened to accept the data, so the handhold device consumes a lot of power as well, which shortens the portable device's continuous using time.

If the period is too long, and the connection channel cannot be maintained to be available, then some real-time data cannot be pushed from the server to the portable device in time. For the portable device which is supplied by a battery, it possibly leads to the bottleneck of the power supply when the mobile portable device uses data pushing services by the server.

SUMMARY

Embodiments of the invention provide a method, a terminal and a network server for maintaining a connection between the terminal and the network server, which could maintain the connection between the terminal and the network server when the terminal is in a sleep state.

An embodiment of the invention provides a method for maintaining a connection between a terminal and a network server, the terminal having a first processing unit, said first processing unit having a first state and a second state, power consumption of said second state being less than power consumption of said first state; the method comprising:

said terminal or said network server periodically transmitting a heartbeat data packet, to maintain the connection between said terminal and said network server;

wherein, said first processing unit is in said second state.

The terminal further has a second processing unit, power consumption of said second processing unit being less than a power consumption of said first processing unit, said terminal periodically transmitting the heartbeat data packet, the method comprising:

when said first processing unit is in said second state, said second processing unit periodically transmitting a heartbeat data packet to a network server connected through a network.

Preferably, said network server periodically transmitting the heartbeat data packet includes:

said network server transmitting the heartbeat data packet to said terminal, wherein, a hop number of a lifetime TTL of the heartbeat data packet is K−1, K being the hop number of the connection between said network server and said terminal.

Preferably, said network server periodically transmitting the heartbeat data packet, the method further includes:

when said first processing unit is in said second state, and when the heartbeat data packet arrives at said terminal, said second processing unit recognizes whether said heartbeat data packet is a heartbeat data packet in a predetermined format;

when said heartbeat data packet is the heartbeat data packet in a predetermined format, said second processing unit maintaining said first processing unit in the second state.

Preferably, said heartbeat data packet in the predetermined format is a heartbeat data packet with a predetermined length or a heartbeat data packet with a particular identifier.

In the technical solution provided by the embodiment, by transmitting the heartbeat data packet by the communication functional unit of the terminal, it is able to make the main processing unit CPU of the terminal in a sleep state for a long time, thereby greatly saving the electrical power of the terminal. By transmitting a particular heartbeat data packet to the terminal from the server, it is possible to let the heartbeat data packet pass through the NAT gateway, the heartbeat data packet is discarded before it arrives at the terminal, so that the heartbeat data packet will not arrive at the terminal. Since the heartbeat data packet passes through the NAT gateway, and the TCP or UDP connection channel state on the gateway is refreshed, so the connection between the server and the terminal is maintained. The heartbeat data packet in the predetermined format is transmitted, the main processor of the terminal is in a sleep state, and the communication functional unit of the terminal does not process the heartbeat data packet in the predetermined format, so the heartbeat data packet is transmitted to the upper system, and the main processor of the terminal will be not wakened. So the terminal in the sleep state maintains the connection to the network server, and the terminal is not wakened by the heartbeat data packet transmitted by the network server, thus, the power consumption of the terminal can be reduced.

BRIEF DESCRIPTION OF THE DRAWINGS

FIG. 3 is a structural schematic diagram of a heartbeat data packet provided by the second embodiment of the invention;

FIG. 4 is a structural schematic diagram of a terminal provided by the second embodiment of the invention;

DETAILED DESCRIPTION

With respect to the defects and drawbacks existing in the prior art, the invention proposes a new method for maintaining the TCP or UDP data channel in this type of application, which can be applied to a wireless terminal as well as a wired terminal. In the method, when the terminal is in a sleep state, the communication functional unit of the terminal (such as Modem module, Bluetooth functional module and so on) transmits a heartbeat signal to/from a network server. In particular, the communication functional unit periodically transmits the "heartbeat" data to the server; or the server transmits the "heartbeat" data to the terminal, without wakening the main processing unit of the terminal, so the connection between the server and the terminal is maintained, while the terminal is in a sleep state.

A "heartbeat agent" is set in the communication functional unit of the terminal (such as Modem module, Bluetooth functional module and so on), and the agent periodically transmits the heartbeat data packet to the server, thereby keeping the corresponding TCP/UDP connection in an active state, and maintaining the network connection between the server and the terminal, and at this time, the main CPU is always in the sleep state, thereby reducing the power consumption of the terminal.

To render the principle, features and advantages of the invention more clearly, a description on the invention is performed in combination with preferred embodiments.

The First Embodiment

Figure 1:
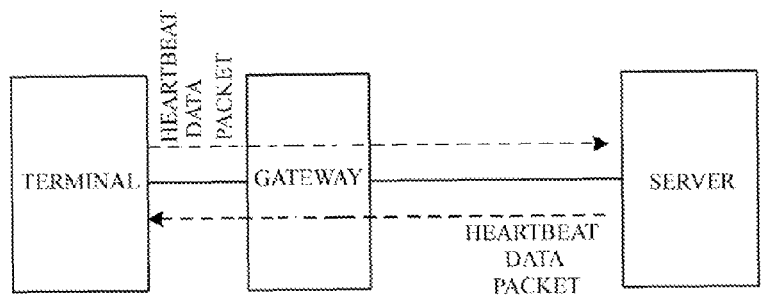
FIG. 1 is a schematic diagram for maintaining a terminal network connection provided by the first embodiment of the invention.

The embodiment of the invention provides a method for maintaining a connection between a terminal and a network server, the terminal has a first processing unit (such as a main processor). The first processing unit has a first state and a second state, wherein, the power consumption of the second state (such as a sleep state) is less than the power consumption of the first state (such as an active state), with reference to FIG. 1, the method comprising:

When the first processing unit is in the second state, the terminal periodically transmits a heartbeat data packet to the network server connected through the network; or the network server periodically transmits the heartbeat data packet to the terminal connected through the network, to maintain the connection between the terminal and the network server.

The step of terminal transmitting the heartbeat data packet particularly further includes:

Before the first processing unit of the terminal enters the second state, the second processing unit (such as Modem) receives the heartbeat data packet; after the first processing unit enters the second state, the second processing unit periodically transmits the heartbeat data packet to the network server connected through the network;

After the network server receives the heartbeat data packet transmitted by the terminal, the network server does not transmit a feedback data packet to said terminal;

Or, after the network server receives the heartbeat data packet, the network server discards the transmitted feedback data packet before it arrives at the terminal;

Or, after the network server receives the heartbeat data packet, the first processing unit is not wakened after the transmitted feedback data packet arrives at the terminal.

The step of the network server transmitting the heartbeat data packet particularly includes:

The network server transmits the heartbeat data packet to the terminal connected through the network, wherein, a hop number of a lifetime TTL of the heartbeat data packet is K−1, and K is the hop number of the connection between the network server and the terminal.

The heartbeat data packet transmitted from the network server to the terminal connected through the network is a heartbeat data packet in a predetermined format, and for example, the heartbeat data packet in the predetermined format is a heartbeat data packet with a predetermined length or a particular identifier.

When the first processing unit is in the second state, when the terminal receives the heartbeat data packet in the predetermined format, the second processing unit of the terminal does not waken the first processing unit, so the first processing unit is maintained to be in the second state.

The Second Embodiment

The terminal accesses to the Internet to establish a network connection (TCP or UDP) between the terminal and the network server. In view of the long data transmission intermittent time, to maintain the connection between the server and the terminal, the main processing unit of the terminal could instruct to create a heartbeat data packet, and transmit it to the communication functional unit (such as Modem, Bluetooth functional unit and so on) before entering a sleep state, and notify the communication functional unit of the period for transmitting the heartbeat packet. When the main processing unit is in a sleep state, the communication functional unit transmits the heartbeat packet to the network server in the period, to maintain the connection between the terminal and the server.

Figure 2:
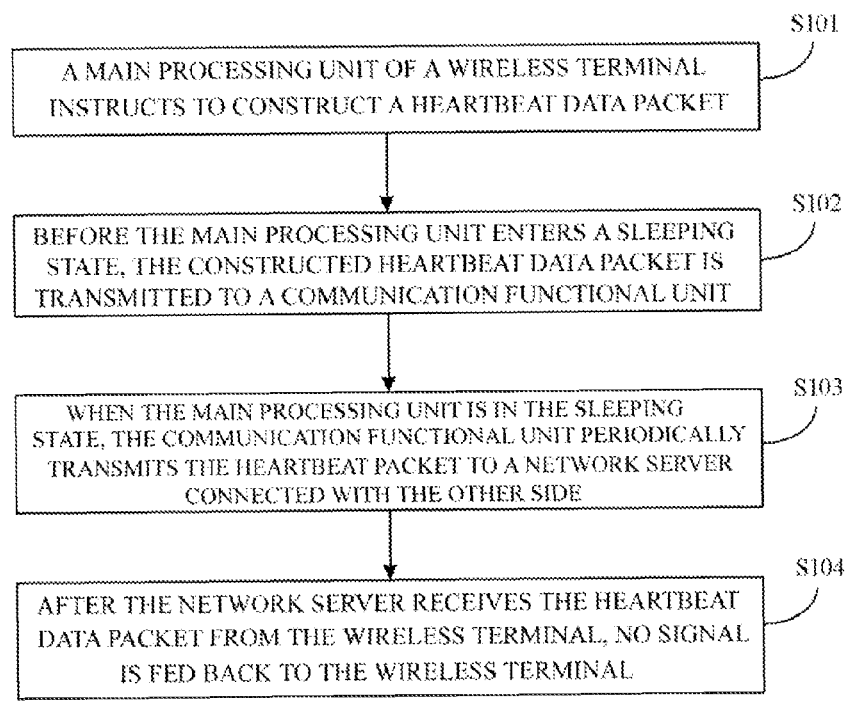
FIG. 2 is a flowchart of a method for maintaining a terminal network connection provided by the second embodiment of the invention.

With reference to FIG. 2, an embodiment provides a method for maintaining a terminal network connection, comprising:

At S101, the main processing unit of the terminal instructs to create a heartbeat data packet.

After the terminal and the server build a network connection (such as TCP), in order to maintain the connection in an active state for a long time, preferably, before the main processing unit enters into a sleep state, the main processing unit instructs a heartbeat control module to construct a heartbeat data packet and obtain the IP address of the network server and the port number corresponding to the connection, to construct the network data packet; or possibly obtain a local IP address and a local port number (optional).

An ACK number and a sequence number included in the data packet transmitted by the network server are obtained; and more preferably, the data packet including the ACK number and the sequence number is the last packet transmitted by the server and received by the terminal.

Further, the main processing unit triggers a packet detection module to detect all the IP packets transmitted by the server to the terminal on the TCP connection of the server (the source IP is the server IP, the source port is a server port, the destination IP is a local IP (optional), and the destination port is a local port number), extracts the sequence number and the ACK number (ACK value) from the IP packet header, and records the sequence number and the ACK value of the last received data packet.

In the embodiment, a description is made by taking a TCP connection as an example, other types of the network connections can construct the heartbeat data packet according to the corresponding format as well.

The IP address of the network server and the port number as well as the acknowledge (ACK) number and the sequence number are used to construct a TCP data packet as the heartbeat data packet.

In the constructed heartbeat data packet, the sequence number in the TCP header is the ACK number included in the data packet transmitted by the server; and the ACK number in the TCP header is the sequence number included in the data packet transmitted by the server.

Specifically, the generated heartbeat data packet complies with the TCP data packet format. With reference to FIG. 3, in the heartbeat data packet, the 32-bit sequence number in the TCP header is set to the 32-bit ACK number value of the last received packet transmitted from the server before the main processing unit enters the second state; the 32-bit ACK number value in the TCP header is set to the 32-bit sequence number value of the last received packet transmitted from the server before the main processing unit enters the second state; the destination IP address of the IP header is set to the IP address of the server corresponding to the connection; the source IP address of the IP header is set to the source IP address of the connection; the source port number of the TCP header is set to the source port number of the connection; the destination port number of the IP header is set to the destination port number of the connection; other fields in the TCP header are set according to a standard specification; and the data portion can be null, or can include some data content. The TCP option content can be arbitrarily set, or there can be no TCP option.

At S102, before the main processing unit enters a sleep state, the constructed heartbeat data packet is transmitted to the communication functional unit (such as Modem module, Bluetooth functional module and so on);

In a certain period, if the terminal does not perform an operation such as accessing networks, browsing WebPages, downloading data and so on, there is no data transmission on the TCP connection, and the main processing unit enters into a sleep state. To maintain the TCP connection within a relatively long data transmission intermittent period, before the main processing unit enters into a sleep state, the constructed heartbeat data packet was transmitted to the communication functional unit, meanwhile the communication functional unit was notified of the period for transmitting the heartbeat packet, and a "heartbeat agent" program executed by the communication functional unit was executed. Thus, the main processing unit CPU and the running operating system can enter into a sleep state, without being wakened each time the heartbeat data is transmitted (as in conventional methods), thereby greatly saving the electrical power and reducing the power consumption.

At S103, when the main processing unit is in a sleep state, the communication functional unit periodically transmits the heartbeat packet to the network server on the other side of the connection, to maintain the connection between the terminal and the network server.

If the detection module on the terminal detects that there are no new data packets has been arrived or transmitted on the connection for a certain period, a process for the communication functional unit to transmit the heartbeat data packet will be initiated. Or, after an instruction for initiating the "heartbeat mechanism" transmitted from the main processing unit is received, the communication functional unit initiates a process for transmitting the heartbeat data packet.

At S104, after the network server receives the heartbeat data packet from the terminal, no signals will be fed back to the terminal.

The heartbeat data packet complies with the TCP protocol. When the network server receives this heartbeat data packet, it does not need to do any change. According to the procedure of the current TCP protocol stack standard, the network server will discard this TCP packet, and the TCP protocol stack of the network server will not upload the packet to upper applications. Thus, it is not necessary to do any change to systems or application software on the network server.

In addition, once the terminal receives a normal data packet transmitted from the server, the communication functional unit stops the heartbeat transmission process, and the main processing unit is wakened, and the main processing unit starts to perform the normal data transmission/receipt process.

In an embodiment, the heartbeat control module and the detection module are implemented in the same functional module, but in other embodiments, they can be implemented as two functional modules.

In the terminal, the main processing unit (such as CPU) is a processing unit for running an operating system and application programs; the communication functional unit is a Modem or other similar functional unit in the terminal, and the communication functional unit has simple processing ability. For example, the Modem has basic capability for transmitting/receiving the data to/from the network interface. In the invention, the communication functional unit, for example, Modem, does not need to execute the complex TCP/TP protocol stack, thereby quickly, conveniently and easily transmitting the heartbeat data packet, and it can be easily implemented.

The embodiment further provides a terminal, as shown in FIG. 4, and the terminal 200 includes:

A first processing unit 210, which could be in a first state or a second state, a power consumption of said second state is less than a power consumption of said first state;

A second processing unit 220, connected with the first processing unit 210, the power consumption of the first processing unit 210 in the first state is larger than the power consumption of the second processing unit 220;

If said first processing unit 210 is in the second state, the second processing unit 220 periodically transmits a heartbeat data packet to a network server connected through a network, to maintain a connection between said terminal and said network server.

The first processing unit 210 includes:

A data packet generating module 211, configured to generate the heartbeat data packet;

A data packet transmitting control module 212, configured to indicate to transmit the heartbeat data packet to the second processing unit.

The description is described here by taking TCP connection as an example, and other types of network connections can construct the heartbeat data packet according to a corresponding format as well.

The data packet generating module 211 uses the IP address of the network server and the port number as well as the acknowledge (ACK) number and the sequence number of the data packet from the network server to construct a TCP data packet as the heartbeat data packet. The sequence number in a header of the TCP data packet is the acknowledge (ACK) number of the data packet transmitted by said network server; and the acknowledge (ACK) number in the header of the TCP data packet is a sequence number of the data packet transmitted by said server.

In particular, the generated heartbeat data packet conforms to TCP data packet format. As shown in FIG. 3, in the heartbeat data packet, the 32-bit sequence number in the header of the TCP data packet is set to a 32-bit acknowledge (ACK) number value of the last received packet transmitted by said server before the main processing unit enters the second state; the 32-bit acknowledge (ACK) number in the header of the TCP data packet is set to a 32-bit sequence number value of the last received packet transmitted by said server before the main processing unit enters the second state; the destination IP address in the IP header is set to the IP address of the server corresponding to the connection; the source IP address in the IP header is set to the source IP address of the connection; the source port number in the TCP header is set to the source port number of the connection; the destination port number in the IP header is set to the destination port number of the connection; other fields in the TCP header are set according to the standard specification; and the data portion can be null or can include some data content. The TCP optional content can be arbitrarily set.

The data packet generating module 211 particularly includes:

a first information obtaining module 211a, configured to obtain an IP address of the network server and a port number corresponding to the connection between the terminal and the network server;

a second information obtaining module 211b, configured to obtain an acknowledge (ACK) number and a sequence number of the last TCP data packet transmitted by the network server before the first processing unit enters the second state; and a data packet constructing module 211c, configured to use the IP address of the network server and the port number as well as the acknowledge (ACK) number and the sequence number to construct a TCP data packet as the heartbeat data packet.

Before the first processing unit 210 enters the second state, a data packet transmitting control module indicates to transmit the heartbeat data packet to the second processing unit 220.

The second processing unit 220 transmits the period for the heartbeat packet, and initiates a "heartbeat agent" program executed by the second processing unit 220. Thus, the first processing unit 210 and the running operating system can enter the sleeping state, and they will not be wakened each time the heartbeat data packet is transmitted, which can greatly save the electrical power and reduce the power consumption. In particular, the first processing unit 210 is the main processor; the first state is an awake state while the second state is a sleeping state; said second processing unit 220 is a Modem. Here, it is to be noted that any processor, microprocessor and so on can be used as the first processing unit 210, and predetermined software or firmware can be used to implement the above modules of the first processing unit 210.

In the technical solution provided by the embodiment, by transmitting the heartbeat data packet by the second processing unit (communication functional unit, such as Modem) of the terminal, the first processing unit (main processing unit, CPU) of the terminal is enable to be in the sleeping state for a long time, so as to greatly save the electrical power of the terminal. The method can be applied to data channels with different protocols such as TCP, UDP and so on.

A Third Embodiment

Figure 5:
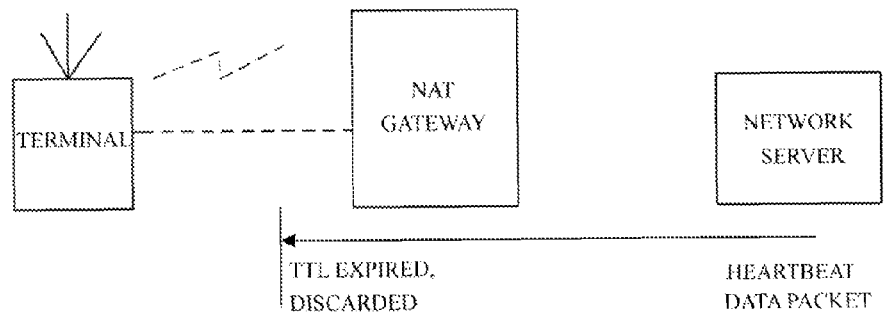
FIG. 5 is a principle diagram for maintaining a terminal network connection provided by a third embodiment of the invention.

In order to maintain the connection (TCP or UDP) between the network server and the terminal, in the embodiment, the server transmits a special heartbeat data packet to the terminal. By setting a related parameter value for the special heartbeat data packet (IP packet), particularly, a predetermined lifetime (TTL) value, the heartbeat data packet is able to pass a NAT gateway, but the heartbeat data packet is discarded before arriving at the terminal, as shown in FIG. 5. Since the heartbeat data packet passes the NAT gateway, the channel state of the TCP or UDP connection on the gateway could be refreshed, thereby maintaining the connection between the server and the terminal.

The network server transmits the special data packet, to maintain the connection between the network server and the terminal, so that the terminal in the sleeping state can maintain the connection to the network server, and is wakened due to the heartbeat data packet transmitted by the network server.

Figure 6:
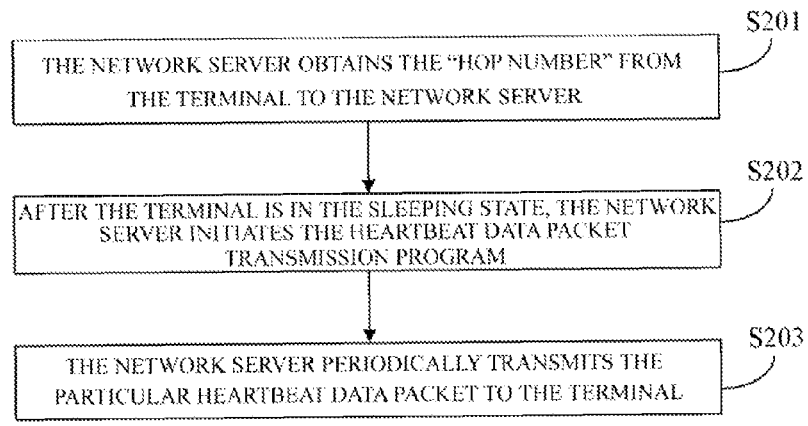
FIG. 6 is a flowchart of a method for maintaining the terminal network connection provided by the third embodiment of the invention.

As shown in FIG. 6, the embodiment provides a method for maintaining the connection between the terminal and the network server, comprising:

S201, the network server obtains a "hop number" from the terminal to the network server.

The network server extracts the "hop number" from the terminal to the network server from the data packet received from the terminal, assuming the hop number is K.

S202, after the terminal automatically enters a sleep state, the network server initiates a heartbeat data packet transmission program;

In a certain period, if the terminal does not perform an operation such as accessing networks, browsing WebPages, downloading data and other operations, then there is no data transmission on the TCP connection, the main processing unit of the terminal enters the sleeping state. The terminal transmits an instruction to the network server before automatically entering the sleeping state, notifies the network server of initiating the heartbeat mechanism, and the network server initiates the heartbeat data packet transmission process after receiving the instruction; or the network server transmits a sleeping instruction to the terminal, the terminal enters a sleeping state, and then the network server initiates the heartbeat data packet transmission program.

S203, the network server periodically transmits the predetermined heartbeat data packet to the terminal.

In particular, the last TCP data packet transmitted from the network server to the terminal before the terminal enters the sleeping state is used as the heartbeat data, the lifetime (TTL) in the IP header of the data packet is set to K−1. The network server retransmits the heartbeat packet to the terminal in a predetermined period. Since the TTL value of the data packet is K−1, the data packet will be discarded after passing the NAT gateway, before arriving at the terminal. So the main processor (CPU) of the terminal is not wakened, which saves the electrical power of the terminal.

If the network server is going to transmit the normal data packet, the network server stops transmitting the heartbeat data packet.

If the network server receives the normal data packet transmitted from the terminal, such as a network service request, then the network server stops the heartbeat data packet transmission process.

If there is no data transmission on the maintained connection (TCP or UDP) between the network server and the terminal, the network server reinitiates the heartbeat data packet transmission process, as explained above, which will not be repeated.

The network server checks the "hop number" value of the latest data packet transmitted from the terminal, to ensure that the "hop number" value is always the latest, to prevent the "hop number" value from changing and the heartbeat mechanism from going wrong after the network environment of the terminal changes.

In the technical solution provided by the embodiment, by transmitting the particular heartbeat data packet to the terminal by the server, the heartbeat data packet is enabled to pass the NAT gateway, and is discarded before arriving at the terminal, so that the heartbeat data packet will not arrive at the terminal. Since the heartbeat data packet passes the NAT gateway, the channel state of the TCP or UDP connection on the gateway will be refreshed, so as to maintain the connection between the server and the terminal. Thus, the terminal in the sleeping state can maintain the connection to the network server, and is not wakened due to the heartbeat data packet transmitted by the network server. Thus, the power consumption under the standby state of the terminal can be reduced.

A Fourth Embodiment

In order to maintain the connection (TCP or UDP) between the network server and the terminal, in the embodiment, the server transmits a heartbeat data packet in a predetermined format to the terminal. The heartbeat data packet is configured with a particular identifier bit, or the heartbeat data packet has a particular length, and the terminal does not process the heartbeat data packet.

When the main processing unit is in the sleeping state, the communication functional unit of the terminal does not waken the main processing unit after receiving the heartbeat data packet. The communication functional unit does not process the heartbeat data packet, for example, the communication functional unit directly discards it.

When the heartbeat data packet arrives at the terminal, the communication functional unit identifies the heartbeat data packet according to the predetermined length or the particular identifier.

If the received heartbeat data packet is determined to be the heartbeat data packet in the predetermined format, the communication functional unit does not process the heartbeat data packet, for example, the communication functional unit directly discards it.

Figure 7:
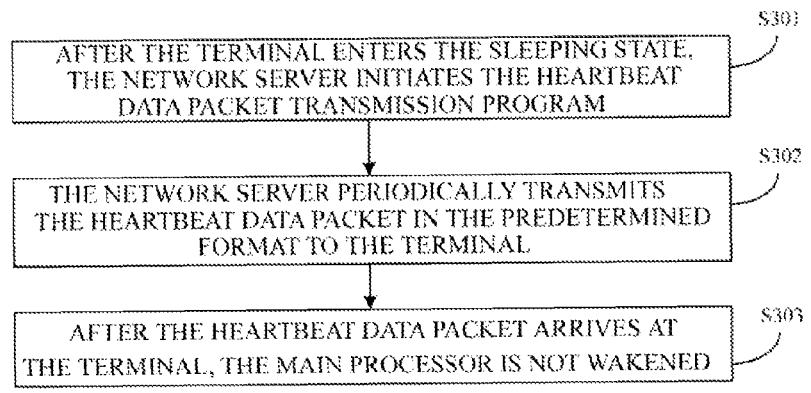
FIG. 7 is a flowchart of a method for maintaining a terminal network connection provided by the fourth embodiment of the invention.

As shown in FIG. 7, the embodiment provides a method for maintaining the connection between the terminal and the network server, comprising:

S301, after the terminal enters the sleeping state, the network server initiates a heartbeat data packet transmission program.

Within a certain period, if the terminal does not perform an operation such as accessing networks, browsing WebPages, downloading data, there is no data transmission on the TCP connection, and the main processing unit of the terminal is going to enter the sleeping state. The terminal automatically transmits an instruction to the network server before entering the sleeping state, to notify the network server to initiate the heartbeat mechanism. The network server enters the heartbeat data packet transmission process after receiving the instruction; or the network server transmits a sleeping instruction to the terminal, then the terminal enters the sleeping state, and then the network server initiates the heartbeat transmission program.

S302, the network server periodically transmits the heartbeat data packet in the predetermined format to the terminal.

In particular, before the terminal enters the sleeping state, the network server transmits the last TCP data packet to the terminal, and sets this TCP data packet, and the data packet obtained by the setting is used as the heartbeat data.

The heartbeat packet in the predetermined format is constructed according to the following format:

the length of the data portion of the heartbeat data packet is 0; other parameters of the heartbeat data packet are consistent with the last TCP data packet transmitted from the server to the network terminal, and the length of the data packet is 40 bytes (basic IP header data plus TCP basic header data). Or, the heartbeat data packet is configured with a particular identifier.

S303, after the heartbeat data packet arrives at the terminal, the main processor is still not wakened;

After the heartbeat data packet arrives at the terminal, the communication functional unit (such as Modem) of the terminal identifies the heartbeat data packet according to the length of the data portion or the particular identifier in the heartbeat data packet. When the Modem detects the data packet, if it is found that the data portion of the heartbeat data packet has a length of 40 bytes or contains a particular identifier, the data packet is determined as the heartbeat data packet in the predetermined format. Then, the Modem discards the data packet, without wakening the upper system. Thus, the main CPU of the terminal is not wakened, thereby saving the electrical power of the terminal.

A Fifth Embodiment

Figure 8:
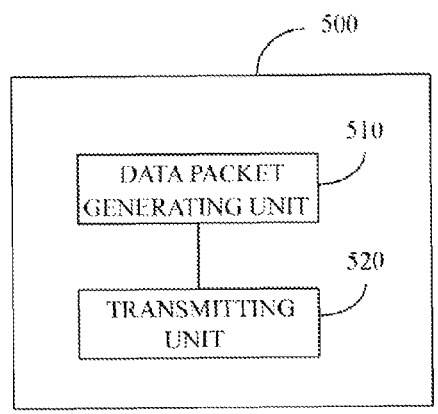
FIG. 8 is a structural schematic diagram of a server provided by a fifth embodiment of the invention.

As shown in FIG. 8, the embodiment of the invention provides a network server 500, comprising:

a data packet generating unit 510, configured to construct a particular heartbeat data packet, the heartbeat data packet being used to maintain a connection between a network server and a terminal;

a transmitting unit 520, connected with the data packet generating unit, configured to transmit the particular heartbeat data packet to the terminal through a network;

wherein, a hop number of a lifetime (TTL) of the particular heartbeat data packet is K−1, K is the hop number of the connection between the network server and the terminal.

The network server extracts the "hop number" from the terminal to the network server from the data packet received from the terminal. The data packet generating unit 510 constructs the heartbeat data packet with the hop number of the lifetime (TTL) of K−1. The transmitting unit 520 transmits the constructed heartbeat data packet to the terminal connected through the network.

After the terminal enters the sleeping state, the network server initiates the heartbeat data packet transmission program; since the TTL value of the heartbeat data packet is K−1, after passing the NAT gateway, the heartbeat data packet is discarded before arriving at the terminal. Thus main processor CPU of the terminal is not wakened, thereby saving the electrical power of the terminal.

Alternatively, the particular heartbeat data packet can also be the heartbeat data packet with a predetermined length or a particular identifier.

The terminal connected with the network server includes a first processing unit and a second processing unit, the first processing unit has a first state and a second state, a power consumption of the second state is less than a power consumption of the first state. During the process for maintaining the connection between the network server and the terminal, the first processing unit is in the second state. The second processing unit is connected with the first processing unit, the power consumption of the first processing unit in the first state is larger than the power consumption of the second processing unit.

After the heartbeat data packet arrives at the terminal, after the second processing unit of the terminal identifies the heartbeat data packet according to the predetermined length or the particular identifier, the upper system is not wakened, and the data packet can be directly discarded. Thus, the first processing unit (the main processor, CPU) of the terminal is in the second state, for example, the second state is the sleeping state, and the main processor is not wakened, thereby saving the electrical power of the terminal.

In the technical solution provided by the embodiment, by the server transmits the heartbeat data packet in the predetermined format to the terminal, the first processing unit (main processor) of the terminal is in the sleeping state, and the communication functional unit of the terminal does not process the heartbeat data packet in the predetermined format, and does not transmit the heartbeat data packet to the upper system, thus the first processing unit (main processor) of the terminal is not wakened, so that the terminal in the sleeping state can maintain connection to the network server, and is not wakened due to the heartbeat data packet transmitted by the network server, thereby reducing the power consumption of the terminal. Here, it is to be noted that, according to the embodiment of the invention, the first processing unit of the terminal is not wakened due to the heartbeat data packet transmitted by the network server, but the operation of the user on the terminal (for example, pressing the button on the terminal or the touch sensor on the touch terminal, and so on) may waken the first processing unit of the terminal. In this case, even though within the period during which the network server transmits the heartbeat data to the terminal, the operation of the user on the terminal wakens the first processing unit, this wakening is not related to the heartbeat data packet transmitted by the network server.

Obviously, the person skilled in the art should understand that the above respective units or respective steps of the invention can be implemented by the common computing means, and they can be integrated on the single computing means, or distributed over the network composed of a plurality of computing means. Optionally, they can be implemented by executable program codes of the computing means, so that they can be stored in the storage means to be executed by the computing means, or they can be manufactured as respective integrated circuit modules, or the plurality of the units or steps of them can be realized as a single integrated circuit module. Thus, the invention is not limited to any particular hardware or software or their combination.

The above description only relates to the preferred embodiments of the invention, without limiting the protection scope of the invention. Any modification, equivalence, replacement, improvement, and so on made within the spirit and the principle of the invention fall into the protection scope of the invention.

What is claimed is:

1. A method for maintaining a connection between a terminal and a network server, said terminal having a first processing unit and a second processing unit, said first processing unit being a main processing unit that has a first state and a second state, a power consumption of said first processing unit in said second state being less than a power consumption of said first processing unit in said first state, said second processing unit being a communication functional unit, wherein a power consumption of said second processing unit is less than said power consumption of said first processing unit in said first state said method comprising:

said second processing unit of said terminal periodically transmitting a heartbeat data packet to said network server to maintain the connection between said terminal and said network server when said first processing unit of said terminal is in said second state, wherein said heartbeat data packet is generated and transmitted to said second processing unit by said first processing unit before said first processing unit enters said second state, and said network server determines not to transmit a feedback data packet to said terminal after said network server receives said heartbeat data packet or said network server periodically transmitting another heartbeat data packet to said second processing unit of said terminal, to maintain the connection between said terminal and said network server when said first processing unit of said terminal is in said second state.

2. The method for maintaining the connection between the terminal and the network server according to claim 1, wherein, said first processing unit generates said heartbeat data packet by:

obtaining an IP address of said network server and a port number corresponding to the connection between said terminal and said network server;

obtaining an acknowledge number and a sequence number included in the data packet transmitted by said network server; and using the IP address of said network server and said port number as well as said acknowledge number and said sequence number to construct a TCP data packet as the heartbeat data packet.

3. The method for maintaining the connection between the terminal and the network server according claim 2, wherein, in said heartbeat data packet, the sequence number in a header of the TCP data packet is the acknowledge number of a last TCP data packet transmitted by said network server before said first processing unit enters the second state; the acknowledge number in the header of the TCP data packet is the sequence number of the last TCP data packet transmitted by said network server before said first processing unit enters the second state; wherein said network server determines not to transmit the feedback data packet to said terminal by recognizing the sequence number and the acknowledge number in the TCP header of said heartbeat data packet.

4. The method for maintaining the connection between the terminal and the network server according to claim 1, further including:

after said network server receives said heartbeat data packet transmitted by said terminal, not transmitting the feedback data packet to said terminal;

or, after said network server receives the heartbeat data packet, discarding the transmitted feedback data packet before arriving at said terminal;

or, after said network server receives the heartbeat data packet, not waking said first processing unit after the transmitted feedback data packet arrives at said terminal.

5. The method for maintaining the connection between the terminal and the network server according to claim 1, wherein, said network server periodically transmits the another heartbeat data packet, and said method includes:
said network server transmitting the another heartbeat data packet to said terminal, wherein, a hop number of a lifetime (TTL) of the another heartbeat data packet is K−1, and K is the hop number of the connection between said network server and said terminal.

6. The method for maintaining the connection between the terminal and the network server according to claim 1, wherein, said network server periodically transmits the another heartbeat data packet, said method including:
when said first processing unit is in the second state, and when the another heartbeat data packet arrives at said terminal, said second processing unit recognizing whether said another heartbeat data packet is in a predetermined format;
when said heartbeat data packet is the heartbeat data packet in the predetermined preformat, said second processing unit maintaining said first processing unit in the second state.

7. The method for maintaining the connection between the terminal and the network server according to claim 6, wherein, said another heartbeat data packet in the predetermined format is a heartbeat data packet with a predetermined length or a heartbeat data packet with a particular identifier.

8. A terminal, comprising:
a first processing unit, said first processing unit being a main processing unit and having a first state and a second state, a power consumption of said first processing unit in said second state being less than a power consumption of said first processing unit in said first state;
a second processing unit being a communication functional unit and connected with said first processing unit, the power consumption of said first processing unit in said first state being larger than the power consumption of the second processing unit;
wherein, when said first processing unit is in said second state, said second processing unit periodically transmits a heartbeat data packet to a network server connected through a network, to maintain a connection between said terminal and said network server, after said network server receives said heartbeat data packet, said network server determines not to transmit a feedback data packet to said terminal, and
wherein said first processing unit includes a data packet generating module, configured to generate said heartbeat data packet before said first processing unit enters said second state and a data packet transmitting control module, configured to indicate to transmit said heartbeat data packet to said second processing unit before said first processing unit enters said second state.

9. The terminal according to claim 8, wherein, said data packet generating module includes:
a first information obtaining module, configured to obtain an IP address of said network server and a port number corresponding to the connection between said terminal and said network server;
a second information obtaining module, configured to obtain an acknowledge number and a sequence number of a last TCP data packet transmitted by said network server before said first processing unit enters the second state; and
a data packet constructing module, configured to use the IP address of said network server and said port number as well as said acknowledge number and said sequence number to construct a TCP data packet as the heartbeat data packet.

10. The terminal according to claim 8, wherein,
said first processing unit is a main processor, wherein, said first state is a waking state while said second state is a sleeping state;
said second processing unit is a modem.

11. A network server, comprising:
a data packet generating unit, configured to construct a particular heartbeat data packet, said heartbeat data packet being used to maintain a connection between the network server and a terminal;
a transmitting unit, connected with said data packet generating unit, configured to periodically transmit said particular heartbeat data packet to said terminal through a network to maintain the connection between said terminal and said network server;
wherein, said terminal includes a first processing unit and a second processing unit, said first processing unit is a main processing unit that has a first state and a second state, wherein a power consumption of said first processing unit in said second state is less than the power consumption of said first processing unit in said first state, said second processing unit is a communication functional unit wherein a power consumption of said second processing unit is less than said power consumption of said first processing unit in said first state and during a procedure in which said particular heartbeat data packet is transmitted to said terminal, said first processing unit is in said second state and said second processing unit recognizes whether said heartbeat data packet is in a predetermined format and maintains said first processing unit in said second state if said heartbeat data packet is in a predetermined format.

12. The network server according to claim 11, wherein, said particular heartbeat data packet is:
a heartbeat data packet with a hop number of a lifetime TTL being K−1, K being the hop number of the connection between said network server and said terminal;
or a heartbeat data packet with a predetermined length or a particular identifier.

* * * * *